(Model.)

3 Sheets—Sheet 1.

D. T. WINTER.
MACHINE FOR MEASURING THE AREA OF HIDES, SURFACES, &c.

No. 258,969. Patented June 6, 1882.

Witnesses.
F. L. Ourand
J. J. McCarthy

Inventor.
David T. Winter
by John J. Halsted
his Atty.

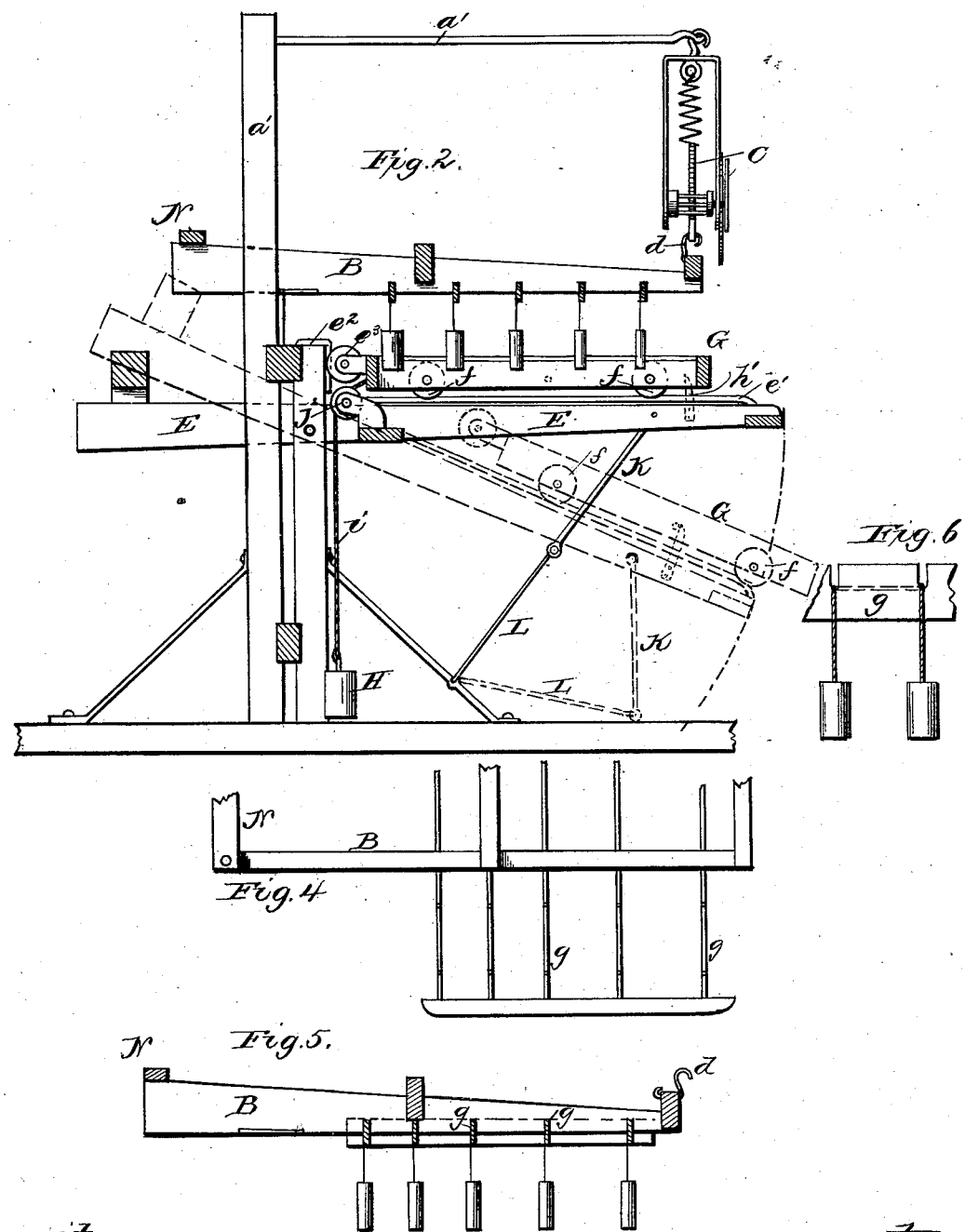

(Model.)
3 Sheets—Sheet 3.
D. T. WINTER.
MACHINE FOR MEASURING THE AREA OF HIDES, SURFACES, &c.
No. 258,969. Patented June 6, 1882.
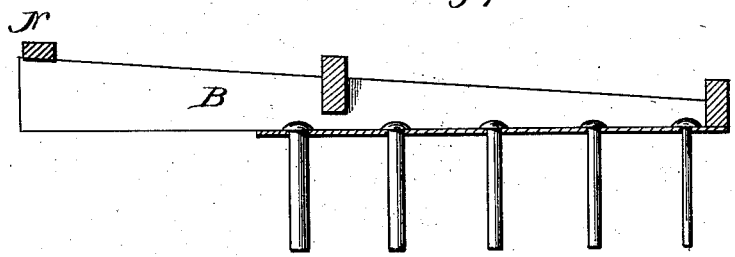
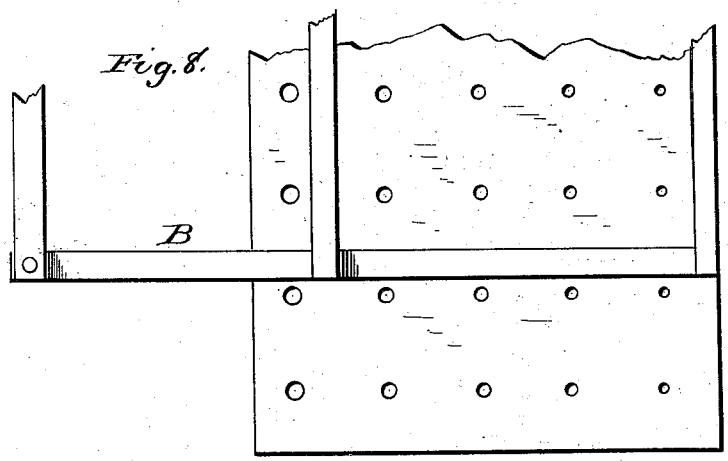
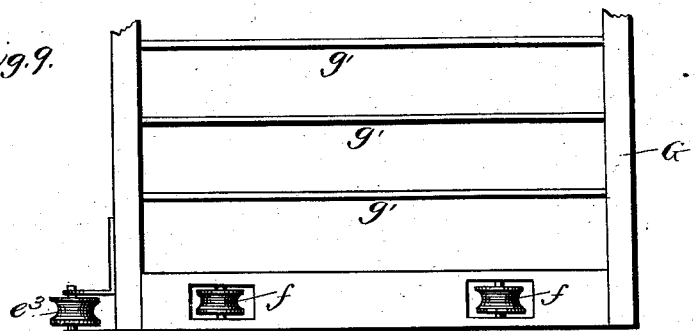
Witnesses.
Franck L. Ourand
J. J. McCarthy.
Inventor
David T. Winter
by John J. Halsted.
his Atty.

UNITED STATES PATENT OFFICE.

DAVID T. WINTER, OF PEABODY, MASSACHUSETTS.

MACHINE FOR MEASURING THE AREA OF HIDES, SURFACES, &c.

SPECIFICATION forming part of Letters Patent No. 258,969, dated June 6, 1882.

Application filed March 17, 1881. (Model.)

*To all whom it may concern:*

Be it known that I, DAVID THOMAS WINTER, of Peabody, in the county of Essex and State of Massachusetts, have invented certain new and useful Improvements in Machines for Measuring the Area or Surface of Skins or other Articles; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My present invention is a further improvement on the construction shown in my Patents Nos. 208,942 and 215,853; and it has in part for its objects the avoidance of a swinging motion of the pendent weights to raise them from or to bring them down to the article to be measured; the keeping of the indicator-hand, when adjusted properly, always balanced at zero, except when indicating a measurement; the small liability of the machine to get out of balance; the ease with which the operator can see at a glance when the machine is out of balance, and the greater facility in placing and removing the article to be measured.

It consists in making the lower or skin-supporting frame a lever-frame swinging in the arc of a circle on fulcra; in combining with it a sliding carriage or table running on guide-rails on such frame, such table, when run outward, receiving the skin and when run inward carrying the skin with it to its proper place for measurement; in means for arresting and limiting both the downward and upward movements of this lever-frame; in a novel system of graduated weights or pins of uniform length; in attaching the weighted table at any point desired, whether at its front or not, directly to the balance or indicating apparatus, and without any intermediate flexible chain or connection; in a novel system of graduated distances apart of the several rows of the pins or weights, and in other details, all as hereinafter more particularly described.

Figure 1:
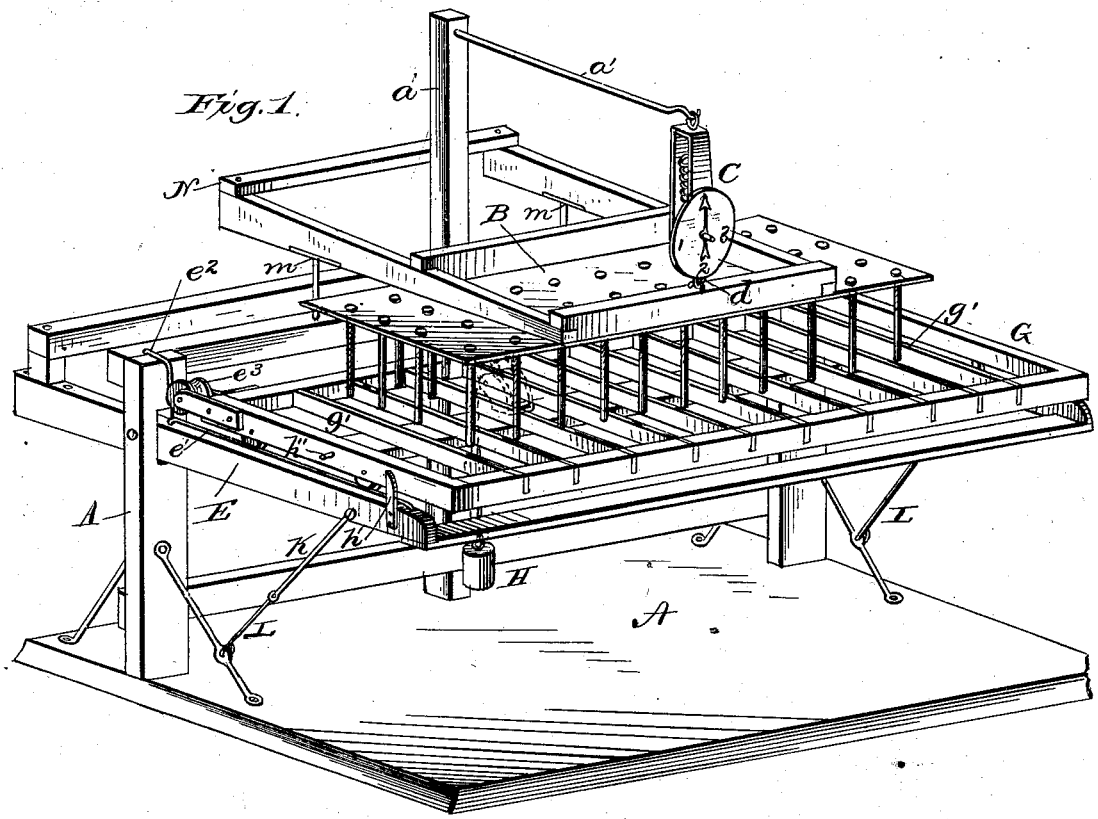
Figure 3:
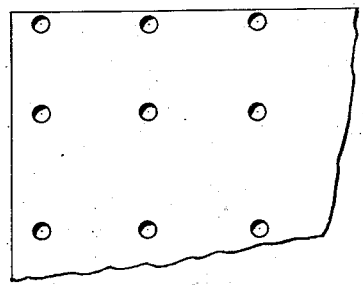

Figure 1 is a perspective view of a machine illustrating my invention, the balanced frame or table having headed pins; Fig. 2, a vertical section, the balanced frame or table having graduated weights; Fig. 3, sections of a balanced frame or table with pins at graduated distances; Fig. 4, a partial view in plan, and Fig. 5 a section of a balanced frame or table with uniform weights at graduated distances; Fig. 6, a fragment enlarged, showing a mode of hanging the weights; Fig. 7, a section showing pins graduated in weight, but in equidistant rows; Fig. 8, a fragmentary view of a balanced frame adapted for such pins, and Fig. 9 a fragmentary view of the under side of the traveling carriage.

A is the frame or body of the machine, having a bracket, $a'$; B, a balanced frame or table; C, a suspended balance or indicating apparatus, hung from the bracket $a'$ at any point desired, and which may be connected by a hook, $d$, or rigid fastening directly to the front or any more rearward part of the table B; E, a lower swinging frame, fulcrumed and counterbalanced at its rear, as shown, and having guideways or rails $e'$, on which run rollers or wheels $f$ of the sliding and skin-supporting carriage or table G. This carriage is slotted, as shown at $g'$, and has a suitable counterpoise-weight, H, connected to its rear by a cord or chain, $i$, which passes over a pulley, $j$, on the frame E.

K are rods hung to the front of frame E, and each rod is linked or jointed to another rod or link, L, which is fastened to the frame, floor, or other fixed point, these rods permitting the frame E to rise to its proper horizontal position, when desired, and the rods K serving, when this frame is lowered, to limit its downward movement and to act as legs or supports when thus pulled downward.

The sliding table G, in rolling or sliding backward, is prevented going too far back by vertical guideways $e^2$ on the body A of the machine, and against which guide-rolls $e^3$, (preferably grooved,) upon the rear of table G may abut, and the weight H would of itself prevent its moving too far forward; but I prefer to limit this forward movement by means of an upward projection, $h'$, on the frame E, and a lateral projection or pin, $h''$, on the sliding table G. It will be seen from the above description that because of the movement of the skin-supporting frame and table in the arc of a circle to meet the pins or weights which are in repose, instead of such a movement of the weighted table to meet the skin, there is no need of graduating the lengths of the pins or weights, so that the rear rows may hang the lowest, because there is no movement of the pins or weights in a curved path, and consequently no advancing to or receding from the most forward point of such arc. Therefore, whether employing a system of headed and hanging pins or of suspended weights, I have the bottoms of such pins or weights all reaching down to the same horizontal plane; but the actual weights of these pins or suspended weights of each row may be graduated relatively to its adjacent row, the rows may be equidistant from each other, or the distances between the several rows may be graduated—that is, the rows may vary in proximity to each other according to their respective distances from the edges or points $m$ on which the table B is balanced at its rear. When headed pins are employed, they hang in a well-known manner in holes in the table. When suspended weights are used, they may hang from bars or slats in such table.

Fig. 2 illustrates part of an upper table, having graduated weights suspended by flexible connections and placed in rows equidistant from each other; Fig. 5, part of the table with weights of uniform size and weight suspended in rows not equidistant from each other, but varying in their proximity according to their respective distances from a line running through $m\ m$. Fig. 7 illustrates pins graduated as to weight similarly to the weights in Fig. 2, but held by their heads in rows equidistant from each other; and Figs. 1 and 3, pins of uniform size and weight, but not hung in equidistant rows, but the rows varying in their proximity to each other, as above stated with regard to the set of uniform weights. Whether I employ pins or weights, and whether graduated as to size or distance in each and every case, by my present improved construction the pins or weights, as the case may be, are acted upon by the skin on the sliding carriage when the skin is lifted up against them by means of the upward swing or vibration of the vibratory lever-frame E.

The table B is balanced by a counterpoise, N, which serves to relieve the spring in the spring-balance or indicator C of all the weight of this table, aside from its weights or pins, and so that when the pins or weights are in place they only shall hang on the spring when the apparatus is not in use and is ready for the introduction of a skin or other article.

When the swing-frame E is lowered, and the sliding carriage G has run out or been pulled out and has received a skin to be measured, this carriage is then pushed backward to bring the rear pulleys or rolls, $e^3$, against the guideways $e^2$, and the frame and carriage then automatically rise to the proper horizontal position; and until so pushed back the frame and the carriage, which has thus been run out on its inclined ways, can stay out by their own weight to permit a skin or other article to be placed on or removed from the carriage, it being evident that the joint weight of these is practically increased by drawing the carriage out from the fulcra or centers of motion. It will be seen, also, that if the upper table should chance to get out of true balance, the indexhand, (being at rest,) would show it at once, and it could be at once corrected, whereas if the upper table had to be swung down to meet a stationary skin the hand must necessarily move around the dial, say, a revolution or more to show whether it was in balance or not. In no instance are any of the pins or weights to hang lower than others. They should all reach to the same horizontal plane.

Referring to the rows at graduated distances apart, I employ pins or weights of uniform size and weight and reaching down to the same level, and those in a given row equidistant laterally from each other. Now suppose the rows also were equidistant from each other and the back row to be twelve (12) inches and the front row to be sixty (60) inches from the same pivotal line, and the weighted table to be directly connected to the indicator, the indicator in such case would show five (5) times as much weight to the square foot in front as it would at the rear, because the front weights would have five (5) times the leverage; but if, instead of placing the rows equidistant, I place the back rows a half ($\frac{1}{2}$) inch apart and the two front rows two and a half ($2\frac{1}{2}$) inches apart, it will be apparent that it would take five (5) pins at the back to be equivalent to one (1) in front; or, in other words, if one (1) back pin represents one (1) square inch, one (1) front pin would represent five (5) square inches, and in this way pins or weights of equal weight hanging from a frame or table pivoted at its rear only can be brought back to that equality which they lose by their varying leverages caused by the greater or less distances from the pivotal line. The distance apart of the two back rows of weights or pins, whatever that distance may be, is thus the key by which all the graduation of distances between all the other rows is ascertained and determined.

By my present invention the indicator shows all the time whether the weighted table is properly accounted for by the counterpoise or spring in the indicator; but usually in surface-measuring machines the weight of the pins or weights is brought on the balance-spring in the action of measuring, and unless the weight is brought on when there is no interposing body—such as a skin—it is not easy to determine whether the machine is in balance and the hand at the zero-point. By my invention, however, the weight is not only taken off by the skin, but when the skin is removed the hand (if the table is in correct balance) will move back to zero; and if, perchance, it should not, its real position will be visible all the time the machine is not in operation, thus announcing whether it needs rebalancing or not. My improvement also prevents any needless motion, commotion, or tangling of pendent weights, and thus avoids variances or incorrect measurements and annoyances to the operator.

The sliding carriage answers several purposes. When pulled out it increases the leverage and gains weight enough to hold it down; when pushed back it goes up automatically, assisted by the counterpoise and by the diminishing leverage, and its rear pulleys limit its rear motion when brought back to the proper place beneath the weighted table; and during any further upward movement of the swinging frame in its arc or path the carriage, by the action of its cord and weight, remains held back, with its rear pulleys resting and bearing on the vertical guideways, thus insuring an almost vertical movement for the upper carriage for, say, the last inch of its upward motion, or enough for all practical purposes. Hung as the weighted or balanced table is, and with its weights or pins, its pivotal points or grooves, and its counterpoise all in practically the same plane, even if the bracket should give a little, and thereby allow this table to drop a little in front, yet there would be but small liability for getting out of balance, because the weight on the indicator remains the same.

Although, by way of illustration, the table B is shown connected at its front to the dial, it may in this machine be connected anywhere to the rear of this; but the farther the connection is from the front, the more will the hand move for a foot; and this point of connection may be wherever it will suit the graduations made on the dial.

I claim—

1. In a machine for measuring the areas of skins or other articles, the combination, with an upper weighted table, of a lower lever-frame fulcrumed at the rear of the machine and arranged to be lowered at its front when the skin is introduced, and to be raised to a horizontal position to lift the skin to the weights.

2. In an area-measuring machine, a sliding table or carriage for supporting the article to be measured and arranged to run in and out on guideways to receive such article and to convey it to and from the weights or pins which determine the measurement.

3. In an area-measuring machine, the combination of a lever-frame and a table-carriage arranged to travel thereon, the combination being and operating substantially as and for the purposes set forth.

4. The lever-frame provided with a counter-balance at its rear and with connecting rods or links beneath the same at its front, serving to limit both its upward and its downward motions, substantially as shown and described.

5. In combination with an under lever-frame having a vibratory motion for receiving and raising the skin to be measured, a weighted and balanced upper table directly connected to the indicating apparatus, and whereby the needless lifting and swinging of the weights or pins and disturbance of the indicator may be avoided.

6. A weighted table carrying a system of weights or pins in which those of each adjacent row are all of uniform weight and length, and in which the several rows are placed at varying distances apart or graded as to weight, in the manner and for the purpose substantially as shown and described.

7. A weighted table in which the weights or pins of each row vary as to weight from those of its next adjacent row or rows, substantially as and for the purposes described, and in which the several rows reach down to the same level and are equidistant from each other.

DAVID T. WINTER.

Witnesses:
IRVIN BESSE,
FRANK G. CLOUGH.